United States Patent

Todo et al.

[11] Patent Number: 5,918,367
[45] Date of Patent: Jul. 6, 1999

[54] METHOD OF PRODUCING VALVE LIFTER

[75] Inventors: Tamotsu Todo; Yasuo Fukuda; Noriomi Hosaka; Seiji Tsuruta; Kenji Suzuki; Shin Koizumi, all of Kanagawa, Japan

[73] Assignee: Unisia Jecs Corporation, Atsugi, Japan

[21] Appl. No.: 08/839,339

[22] Filed: Apr. 18, 1997

[51] Int. Cl.$^6$ ................................................ B23P 15/00
[52] U.S. Cl. .................................. 29/890.03; 29/888.43
[58] Field of Search ........................... 29/888.03, 888.43, 29/557, 558

[56] References Cited

U.S. PATENT DOCUMENTS

| | | | |
|---|---|---|---|
| 1,486,927 | 9/1924 | Spire | 29/888.43 |
| 2,963,011 | 12/1960 | Davis et al. | 29/888.03 |
| 3,090,367 | 5/1963 | Ayres | 29/888.03 |
| 3,124,869 | 3/1964 | Behnke et al. | 29/888.03 |
| 5,809,644 | 9/1998 | Adachi | 29/888.43 |

Primary Examiner—Irene Cuda
Attorney, Agent, or Firm—Foley & Lardner

[57] ABSTRACT

A method of producing a valve lifter to be used in a valve operating mechanism of an automotive vehicle. The valve lifter includes a skirt section, a crown section formed one end of the skirt section so that a cam of a camshaft is slidably contactable with the crown section, and a contacting section formed at an inside surface of the crown section and contactable with a valve stem of an engine valve. The production method comprises the following steps in the sequence set forth: (a) cold-forging a base material to form a valve lifter-shaped base material; (b) cold-pressing the base material to shape the valve lifter-shaped base material; (c) grinding an outer surface of the valve lifter-shaped base material to trim an outer shape of the valve-lifter-shaped base material; (d) totally machining the outer surface and an inner surface of the valve-shaped base material to adjust dimensions of parts of the valve lifter-shaped base material; (e) heat-treating only a part of the valve lifter-shaped base material, corresponding to the contacting section, to increase a hardness of the contacting section; and (f) grinding the contacting section to finish the contacting section.

7 Claims, 5 Drawing Sheets

METHOD OF PRODUCING VALVE LIFTER

BACKGROUND OF THE INVENTION

1. Field of the Invention

This invention relates to improvements in a method of producing a valve lifter to be used in an automotive internal combustion engine, and more particularly to the improvements for facilitating the production of the valve lifter while lowering the production cost of the valve lifter.

2. Description of the Prior Art

An automotive internal combustion engine of the DOHC (double overhead camshaft) type is provided with a valve operating mechanism including valve lifters of the directly operated type. Each valve lifter is disposed between a cam integrally formed on a camshaft and an engine valve such as an intake valve to transmit the lift of the cam to the intake valve.

The valve lifter is made of steel and formed generally cup-shaped or into the shape of a cylinder having an upper closed end. The valve lifter includes a cylindrical skirt section which is slidable inside a guide opening formed in a cylinder head. A disc-shaped crown section is formed integral with the inner peripheral surface of the upper part of the skirt section so as to serve as the upper closed end. The crown section is formed with a fitting depression whose periphery is defined by the upper part of the skirt section. A shim is fixed at the top of the skirt section in such a manner that the lower section thereof is press-fitted in the fitting groove. The outer peripheral surface of the cam is brought into slidable contact with the upper surface of the shim. The crown section is integrally provided at its back side surface (facing the intake valve) with a contacting projection or boss which is generally disc-shaped and has a small diameter, in which a valve stem of the intake valve is to be brought into contact with the contacting projection.

Figure 6:
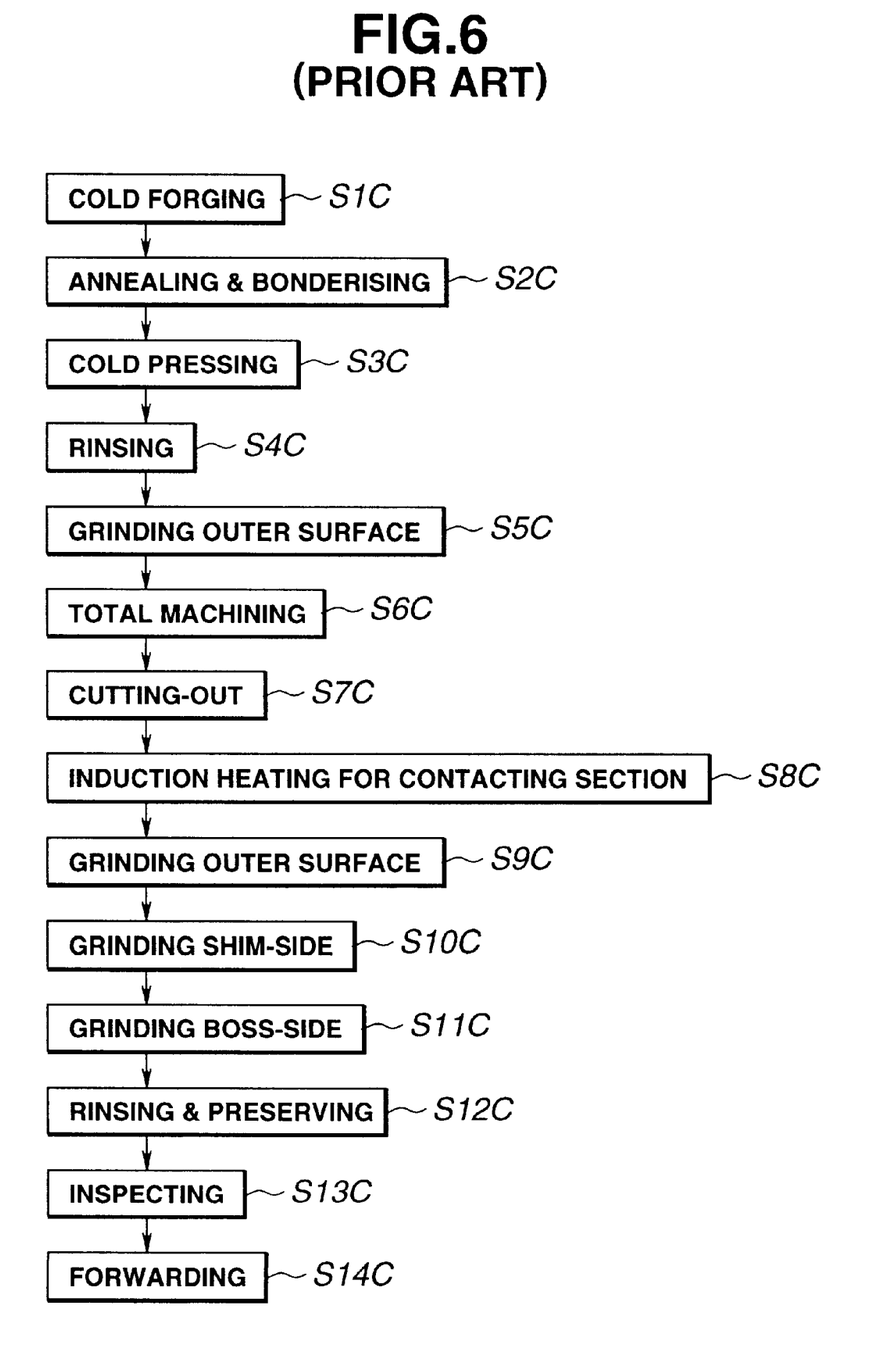
FIG. 6 is a block diagram showing a conventional method of producing a valve lifter.

The valve lifter is usually produced according to a production process shown in FIG. 6. In this production process, first an iron-based base material is subjected to a cold forging to form a valve lifter-shaped base material having the contacting projection having a diameter of about 7 mm, at a step S1C. The valve lifter-shaped base material is subjected to an annealing and a bonderising at a step S2C. Then, a cold pressing is applied to the valve lifter-shaped base material to obtain a necessary hardness of the whole valve lifter-shaped base material, at a step S3C. Subsequently, the valve lifter-shaped base material is rinsed at a step S4C. Then, grinding is made on the valve lifter-shaped material to trim the outer shape of the skirt section at a step S5C. Further, machining is made on the whole body of the valve lifter-shaped base material including the upper surface of the crown section and the surface of the contacting projection so as to trim the shape of the valve lifter-shaped base material, at a step S6C. Thereafter, a cutting-out machining is made onto the upper surface of the crown section to form a fitting depression at the upper surface of the crown section, at a step S7C. A carburizing hardening is made onto the whole valve lifter-shaped base material to increase the hardness of the valve lifter-shaped base material, at a step S8C. Then, the outer surface of the valve lifter-shaped base material is subjected to finish-grinding in order to obtain an outer diameter precision after deformation of the outer surface due to the heat treatment, at a step S9C. The inner surface of the fitting depression and the surface of the contacting projection are subjected to finish-grinding to obtain a precision of the inner diameter and the like of the valve lifter-shaped base material, at steps S10C and S11C. Then, the whole body of the valve lifter-shaped base material is subjected to rinsing and preserving at a step S12C. Lastly, the valve lifter-shaped base material is subjected to inspection at a step S13C and forwarded at a step S14C.

However, drawbacks have been encountered in the above conventional production method of the valve lifter, in which grinding is again made to the whole body of the valve lifter after the heat treatment, thereby unavoidably increasing the number of steps of the production process of the valve lifter. This not only lowers the operation efficiency of the production but also increases the cost of production equipment so as to contribute to a rise in production cost.

SUMMARY OF THE INVENTION

It is an object of the present invention to provide an improved method of producing a valve lifter, which can overcome drawbacks encountered in conventional production methods of valve lifters.

Another object of the present invention is to provide an improved method of producing a valve lifter, which is reduced in number of steps of production process for the valve lifter and lowered in production cost of the valve lifter.

A further object of the present invention is to provide an improved method of producing a valve lifter, in which only a necessary part of the valve lifter is heat-treated to harden the part thereby preventing the whole body of the valve lifter from thermal deformation.

An aspect of the present invention resides in a method of producing a valve lifter including a skirt section, a crown section formed one end of the skirt section so that a cam of a camshaft is slidably contactable with the crown section, and a contacting section formed at an inside surface of the crown section and contactable with a valve stem of an engine valve. The producing method comprises the following steps: (a) cold-forging a base material to form a valve lifter-shaped base material; (b) totally machining the valve lifter-shaped base material to adjust dimensions of parts of the valve lifter-shaped base material; (c) heat-treating only a part of the valve-shaped base material, corresponding to the contacting section, to increase an hardness of the contacting section; and (d) grinding the contacting section to finish the contacting section.

Another aspect of the present invention resides in a method of producing a valve lifter including a skirt section, a crown section formed one end of the skirt section so that a cam of a camshaft is slidably contactable with the crown section, and a contacting section formed at an inside surface of the crown section and contactable with a valve stem of an engine valve. The production method comprises the following steps in the sequence set forth: (a) cold-forging a base material to form a valve lifter-shaped base material; (b) cold-pressing the base material to shape the valve lifter-shaped base material; (c) grinding an outer surface of the valve lifter-shaped base material to trim an outer shape of the valve-lifter-shaped base material; (d) totally machining the outer surface and an inner surface of the valve-shaped base material to adjust dimensions of parts of the valve lifter-shaped base material; (e) heat-treating only a part of the valve lifter-shaped base material, corresponding to the contacting section, to increase a hardness of the contacting section; and (f) grinding the contacting section to finish the contacting section.

A further aspect of the present invention resides in a method of producing a valve lifter including a skirt section, a crown section formed one end of the skirt section so that a cam of a camshaft is slidably contactable with the crown section, and a contacting section formed at an inside surface of the crown section and contactable with a valve stem of an engine valve. The producing method comprises the following steps in the sequence set forth: (a) cold-forging a base material of medium carbon steel to form a valve lifter-shaped base material; (b) heat-treating only a part of the valve lifter-shaped base material, corresponding to the contacting section, to increase a hardness of the contacting section; and (c) grinding the contacting section to finish the contacting section.

According to the above aspects of the present invention, heat-treatment for the purpose of increasing the hardness is made onto only the contacting section (to which a valve stem is contactable), and therefore it becomes unnecessary to grind the outer peripheral surface for adjusting the dimensions of the valve lifter and to make machining to form the fitting depression (for the shim) after the heat treatment as in the conventional technique. As a result, the time required for the heat treatment can be shortened while reducing the number of steps of production process of the valve lifter, thus totally improving the production operation efficiency of the valve lifter. Omitting the above grinding of the whole body of the valve lifter in the conventional technique achieves a large lowering in equipment cost and production cost.

DETAILED DESCRIPTION OF THE INVENTION

Figure 1:
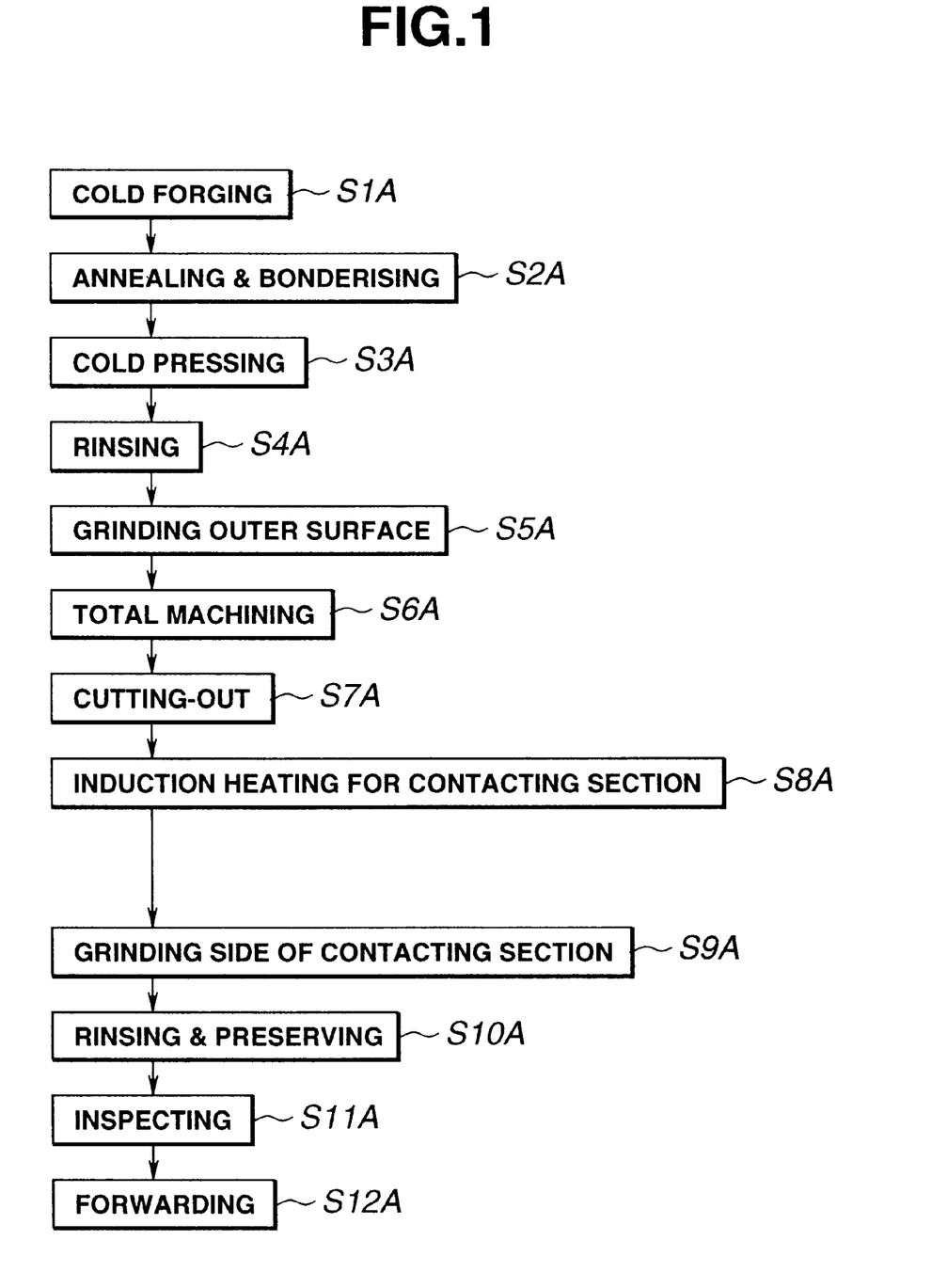
FIG. 1 is a block diagram showing a first example of a method of producing a valve lifter, according to the present invention.

Referring now to FIG. 1, an example of a method (process) of producing a valve lifter, according to the present invention is illustrated. The valve lifter is, for example, one shown in FIGS. 4 and 5 and used in a valve operating mechanism of a DOHC (double overhead camshaft) engine for an automotive vehicle. The valve operating mechanism includes cams 1 integrally formed on each of camshafts 1. The valve lifter 4 of the directly driven type is disposed between the cam 2 and an engine valve such as an intake valve 3 to transmit the lift of the cam 2 to the intake valve 3.

Figure 4:
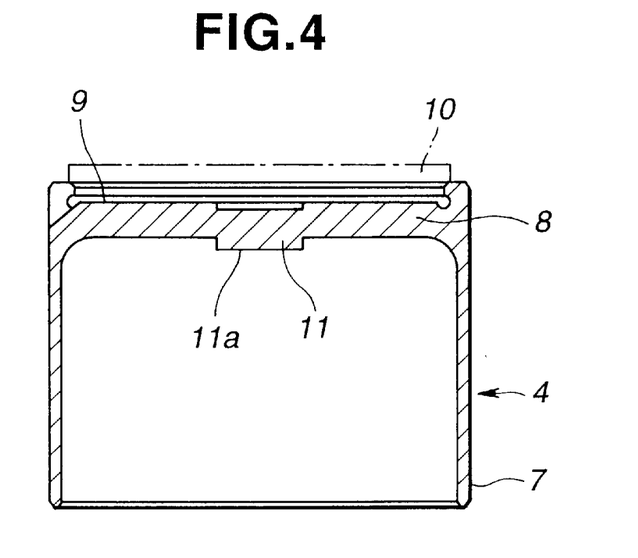
FIG. 4 is a vertical sectional view of an example of the valve lifter produced by the producing methods according to the present invention.
Figure 5:
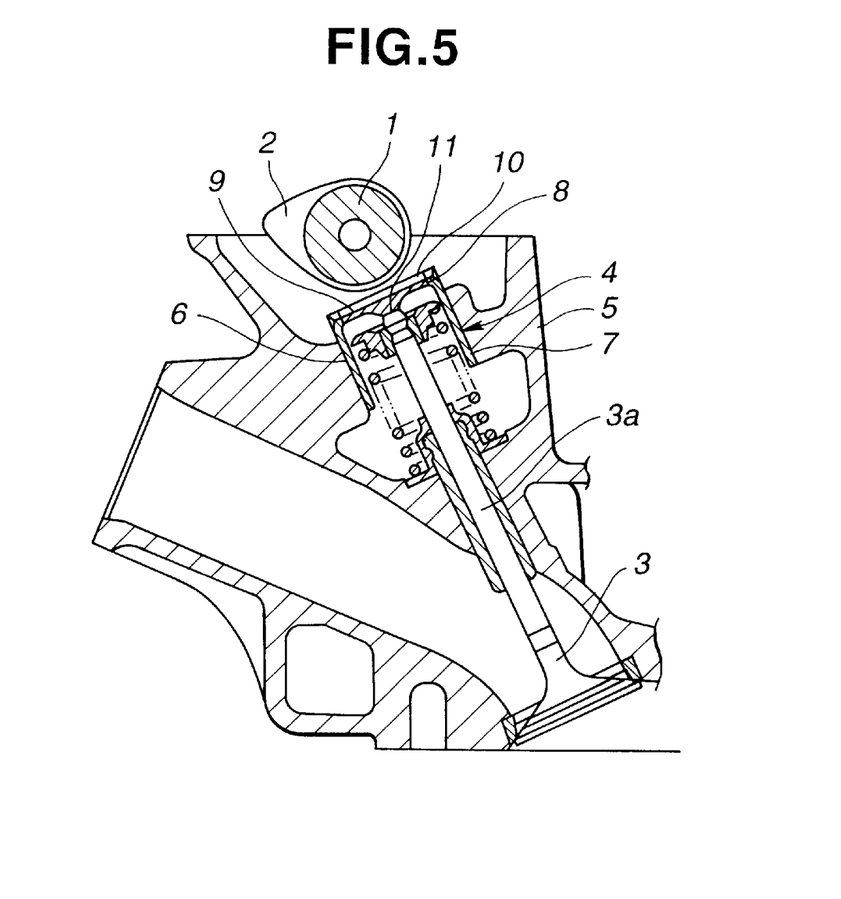
FIG. 5 is a fragmentary vertical sectional view of a DOHC engine provided with a valve operating mechanism including the valve lifter of FIG. 4.

The valve lifter 4 is made of steel and formed generally cup-shaped or into the shape of a cylinder having an upper closed end. The valve lifter 4 includes a cylindrical skirt section 7 which is slidable inside a guide opening 6 formed in a cylinder head 5. A disc-shaped crown section 8 is formed integral with the inner peripheral surface of the upper part of the skirt section 7 so as to serve as the upper closed end. The crown section 8 is formed with a fitting depression 9 whose periphery is defined by the upper part of the skirt section 7. The skirt section 7 and the crown section 8 constitute the main body of the valve lifter 4. A shim or slidable contacting member 10 is fixed at the top of the skirt section 7 in such a manner that the lower section thereof is press-fitted in the fitting depression 9. The outer peripheral surface of the cam 2 is brought into slidable contact with the upper surface of the shim 10. The crown section 8 is integrally provided at its back side or inside surface (facing the intake valve 3) with a contacting section (projection) or boss 11 which is generally disc-shaped and has a small diameter, in which a valve stem 3a of the intake valve 3 is to be brought into contact with the contacting projection 11.

The first example of the method of producing the valve lifter 4, according to the present invention, will be discussed with reference to FIG. 1.

First, a base material (metal) or raw material is subjected to a cold forging so as to be formed into a predetermined shape upon pressing, at a step S1A. The thus pressed base material is subjected to a heat treatment for annealing to accomplish recrystallization of the structure of the base material, and subjected to a bonderising at a step S2A. Then, the base material is subjected to a cold pressing thereby to form the outer shape of the valve lifter to form a valve lifter-shaped base material corresponding to the main body of the valve lifter 4, at a step S3A. The thus shaped base material is rinsed at a step S4A. Subsequently, the outer peripheral surface of the valve lifter-shaped base material is machined in such a manner that the outer surface of the skirt section (7) is ground to adjust the outer diameter of the skirt section (7), at a step S5A. Further, the valve lifter-shaped base material is machined in such a manner that the whole inner peripheral surface including the surface of the contacting section (11) is ground to adjust the inner diameter of the skirt section (7), at a step S6A. Then, a circular cut-out machining is made onto the upper surface of the crown section (8) of the valve lifter-shaped base material to form the fitting depression (9), at a step S7A.

Subsequently, an induction hardening is made onto only the contacting section (11) for a short time thereby increasing the hardness of the contacting section (11) at a step S8A. Then, the hardened contacting section 11 is ground to again adjust the outer diameter and the thickness of the skirt section (7), at a step S9A. Then, the valve lifter-shaped base material is subjected to rinsing and preservating (a rust prevention treatment) thereby completing a production process, at a step S10A, thus producing the main body of the valve lifter 4. The thus produced valve lifter main body is subjected to measurement of the dimensions of various sections thereof and inspection of the inside thereof at a step S11A, and forwarded at a step S12A.

As discussed above, according to this example, the heat treatment (the induction hardening) following the cut-out machining at the step S7A is made locally or only the contacting section 11 without being made throughout the whole main body of the valve lifter 4, so that the heat treatment can be accomplished for a short time and can be made as a part in a production line of the valve lifter 4. Accordingly, the operation efficiency of the heat treatment can be improved. Additionally, the whole main body of the valve lifter 4 cannot be thermally affected thereby suppressing deformation of the skirt section 7. Further, such a local heat treatment can prevent the whole skirt section 7 from being hardened thereby suppressing lowering of impact strength of the valve lifter. This makes it possible to form a further thin-walled skirt section 7 thereby making the valve lifter 4 light-weighted.

Furthermore, it is sufficient that the grinding (at the step S9A) following the heat treatment (at the step S8A) is made only onto the contacting section 11, and therefore machining operation (grinding) is facilitated. As a result, the number of steps in the production process can be reduced thereby improving the operation efficiency of producing the valve lifter 4 in combination with the short time heat treatment at the step S8A.

Moreover, the heat treatment at the step S8A is accomplished by the induction hardening without using carburizing hardening as in the conventional technique. Accordingly, hardening can be made not only onto the surface of the contacting section 11 but also onto the inside of the contacting section 11. As a result, the hardness of the contacting section is largely increased to a value (not lower than 60 in Rockwell hardness C-scale) thus improving the wear resistance and durability of the valve lifter 4. In this connection, the hardness of the skirt section 7 and the like is at a relatively low value (about 25 in Rockwell hardness C-scale), and therefore it is possible to make a high speed cutting to the skirt section 7 and the like, thus improving the operation efficiency of production of the valve lifter 4 from this view point.

Figure 2:
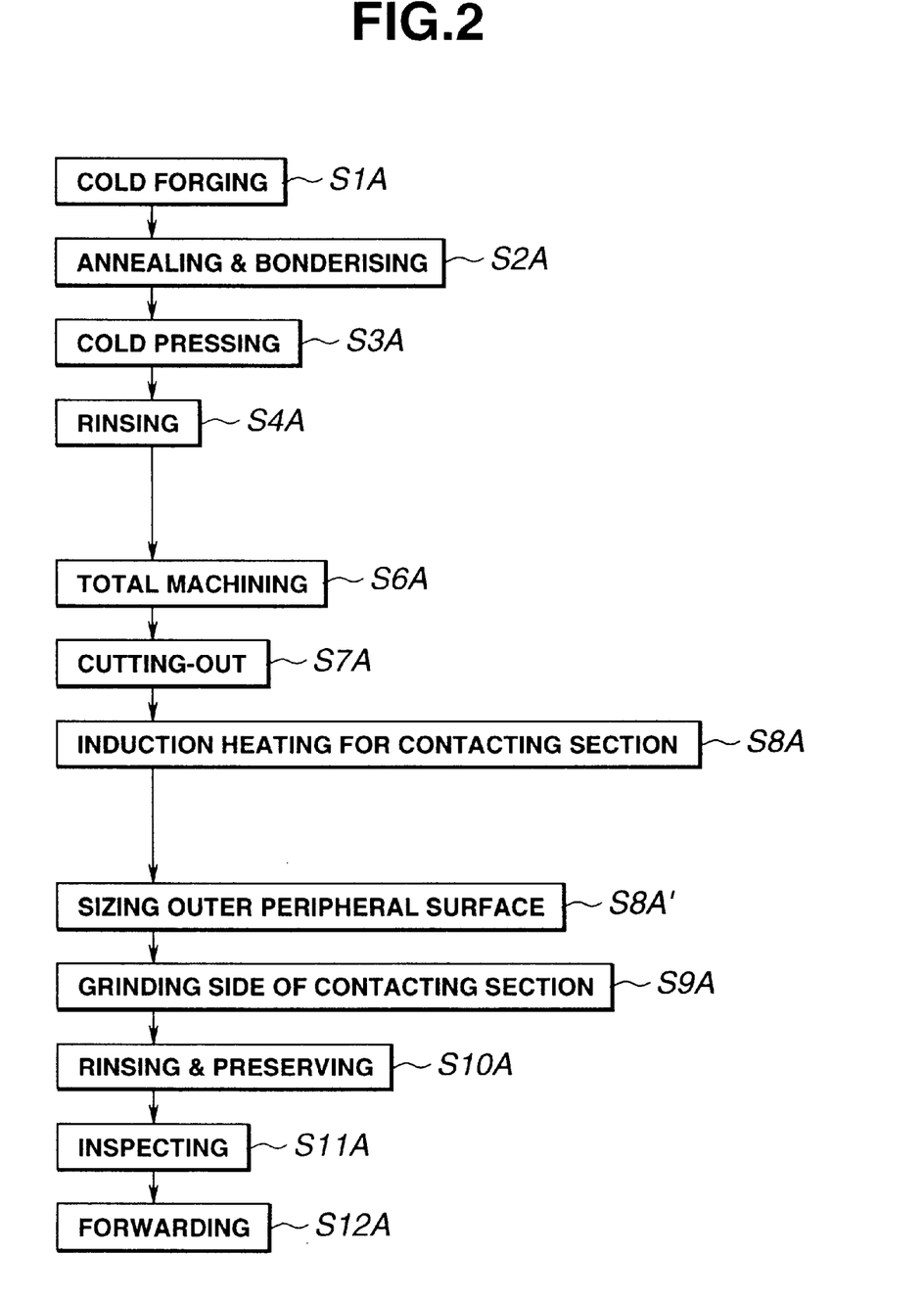
FIG. 2 is a block diagram showing a second example of the method of producing a valve lifter, according to the present invention.

FIG. 2 illustrates a second example of the producing method of the valve lifter, according to the present invention, which is similar to the first example with the exception that the step S5A (grinding the outer peripheral surface of the skirt section) in the production process of the first example is omitted, and that a new step S8A' is added to the production process of the first example. The step S8A' is a step for adjusting the outer diameter of the skirt section 7 by sizing. With this step S8A', a change in outer diameter (owing to the heat treatment of the contacting section 11) of the skirt section 7 is adjusted after the heat treatment thereby obtaining a further precise outer diameter of the skirt section 7. It will be understood that other steps in the production process of this example are similar to those in the production process of the first example, and therefore the same effects as those in the first example can be obtained also in this example.

Figure 3:
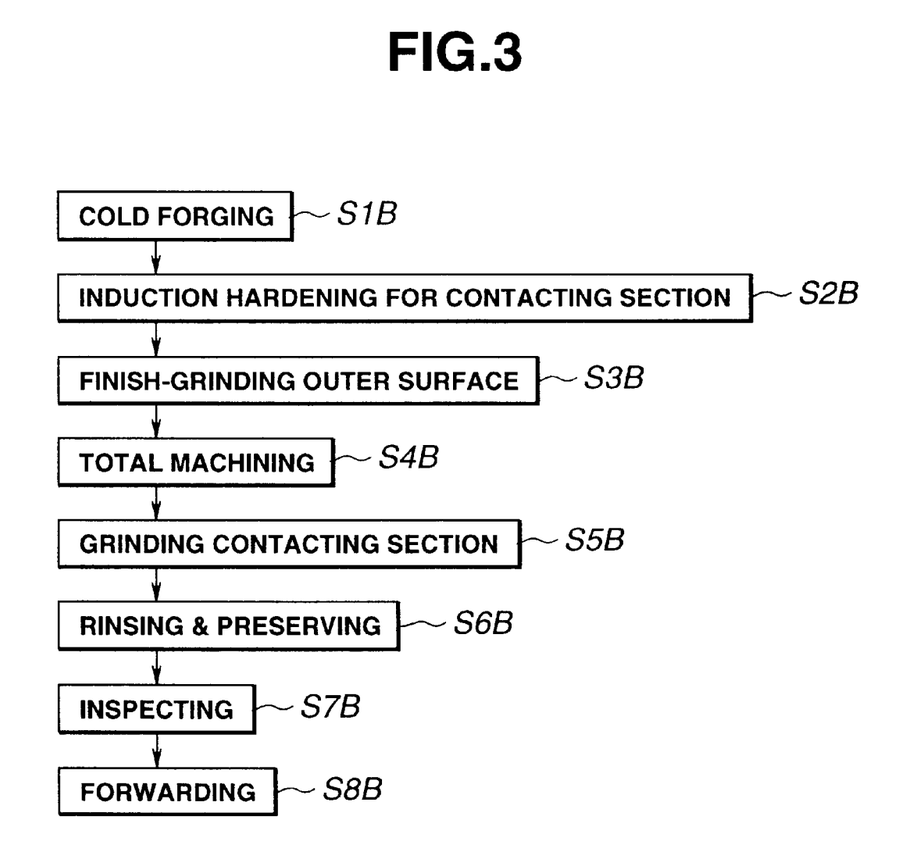
FIG. 3 is a block diagram showing a third example of the method of producing a valve lifter, according to the present invention.

FIG. 3 illustrates a third example of the production method of the valve lifter, according to the present invention. In this embodiment, the base material of the valve lifter 4 is a medium carbon steel which has been adjusted in composition. The base material includes a carbon steel (as a major component) having a carbon (C) content of not less than 0.45%, and includes not more than 0.15 wt % of silicon (Si), not more than 0.25 wt % of manganese (Mn) and not more than 0.2 wt % of chromium (Cr), in which not more than 20 PPM (0.02 wt %) of boron (B) is added to the base material.

The valve lifter 4 is produced according to the following production process as shown in FIG. 3: First, the above-mentioned base material (a thick disc-shaped ingot) including the carbon steel as the major component is pressed into the shape shown in FIG. 4 under cold forging, at a step S1B thus to obtain a valve lifter-shaped base material. Then, only the contacting section (11) is subjected to the induction hardening for a short time, at a step S2B, thereby increasing the hardness of the contacting section 11. The outer peripheral surface of the skirt section (7) of the valve lifter-shaped base material is ground to adjust the outer diameter of the skirt section (7), at a step S3B. The circular cutting-out machining is made onto the upper surface of the crown section (8) of the valve lifter-shaped base material to form the fitting depression (9), and additionally grinding is made onto the bottom surface of the fitting depression (9), the upper peripheral wall defining the fitting depression (9) and the like so as to adjust the axial dimension of the valve lifter-shaped base material, at a step S4B. Then, the lower surface 11a of the contacting section or boss 11 is ground for the purpose of finishing the contacting section 11, at a step S5B. Thereafter, the valve lifter-shaped base material is subjected to rinsing and preserving (the rust prevention treatment) at a step S6B, thus completing the production process. Lastly, the thus produced valve lifter-shaped base material is subjected to measurement of the dimensions of various sections thereof and inspection of the inside thereof at a step S7B, and forwarded at a step S8B.

Since the induction hardening is locally made onto the contacting section or boss 11 without making onto the whole body of the valve lifter-shaped base material, it is possible to complete the heat treatment within a short time. As a result, the same effects as those in the first example can be obtained. Additionally, the base material of the valve lifter 4 is the medium carbon steel so that the content of alloy elements such as Si, Mn and the like is suppressed to a low level as compared with the content of carbon (C). As a result, the main body of the valve lifter 4 is increased in hardness as compared with a case that the base material of the valve lifter 4 is a low carbon steel or an alloy steel. Besides, the cold forgeability of the valve lifter-shaped base material can be improved to a level of alloy steel. Addition of boron to the base material improves the induction hardenability of the base material while preventing the cold forgeability from lowering because deformation resistance is hardly affected by boron.

While no heat treatment has been shown and described as being applied to the skirt section 7 of the valve lifter 4 in the above examples, it will be understood that serious problems such as wear will not arise in the skirt section 7 because the skirt section 7 merely slidingly moves inside the guide opening 6 so as to hardly wear.

Additionally, it will be appreciated that the problems of wear cannot arise in the crown section 8 of the valve lifter 4 since only the shim 10 fitted on the crown section 8 is in sliding contact with the cam 2.

What is claimed is:

1. A method of producing a valve lifter including a skirt section, a crown section formed one end of the skirt section so that a cam of a camshaft is slidably contactable with the crown section, and a contacting section formed at an inside surface of the crown section and contactable with a valve stem of an engine valve, said method comprising the following steps:

cold-forging a base material to form a valve lifter-shaped base material;

totally machining the valve lifter-shaped base material to adjust dimensions of parts of the valve lifter-shaped base material;

heat-treating only a part of the valve-shaped base material, corresponding to the contacting section, to increase an hardness of the contacting section; and grinding the contacting section to finish the contacting section.

2. A method of producing a valve lifter including a skirt section, a crown section formed one end of the skirt section so that a cam of a camshaft is slidably contactable with the crown section, and a contacting section formed at an inside surface of the crown section and contactable with a valve stem of an engine valve, said method comprising the following steps in the sequence set forth:

cold-forging a base material to form a valve lifter-shaped base material;

cold-pressing the base material to shape the valve lifter-shaped base material;

grinding an outer surface of the valve lifter-shaped base material to trim an outer shape of the valve-lifter-shaped base material;

totally machining the outer surface and an inner surface of the valve-shaped base material to adjust dimensions of parts of the valve lifter-shaped base material;

heat-treating only a part of the valve lifter-shaped base material, corresponding to the contacting section, to increase a hardness of the contacting section; and grinding the contacting section to finish the contacting section.

3. A method as claimed in claim 2, further comprising the step of fixing a sliding contactable member onto the crown section, said sliding contactable member being slidingly contactable with the cam of the camshaft.

4. A method as claimed in claim 2, wherein said heat-treating step includes induction-hardening only the contacting section.

5. A method as claimed in claim 2, wherein said base material is an iron-based metal.

6. A method of producing a valve lifter including a skirt section, a crown section formed one end of the skirt section so that a cam of a camshaft is slidably contactable with the crown section, and a contacting section formed at an inside surface of the crown section and contactable with a valve stem of an engine valve, said method comprising the following steps in the sequence set forth:

cold-forging a base material of medium carbon steel to form a valve lifter-shaped base material;

heat-treating only a part of the valve lifter-shaped base material, corresponding to the contacting section, to increase a hardness of the contacting section; and grinding the contacting section to finish the contacting section.

7. A method as claimed in claim 6, wherein said heat-treating step includes induction-hardening only the contacting section.

* * * * *

UNITED STATES PATENT AND TRADEMARK OFFICE
CERTIFICATE OF CORRECTION

PATENT NO. : 5,918,367
DATED : July 6, 1999
INVENTOR(S) : Tamotsu TODO

It is certified that error appears in the above-identified patent and that said Letters Patent is hereby corrected as shown below:

ON THE TITLE PAGE:

insert --[30] Foreign Application Priority Data April 19, 1996 [JP] 8-097815--.

Signed and Sealed this

Eleventh Day of July, 2000

Attest:

Q. TODD DICKINSON

*Attesting Officer*  *Director of Patents and Trademarks*